(12) United States Patent
McKean et al.

(10) Patent No.: US 8,345,366 B2
(45) Date of Patent: Jan. 1, 2013

(54) STORAGE DRIVE PERFORMANCE CHARACTERIZATION

(75) Inventors: Brian McKean, Longmont, CO (US);
Dennis Kleppen, Golden, CO (US)

(73) Assignee: LSI Corporation, Milpitas, CA (US)

( * ) Notice: Subject to any disclaimer, the term of this patent is extended or adjusted under 35 U.S.C. 154(b) by 1160 days.

(21) Appl. No.: 12/214,458

(22) Filed: Jun. 19, 2008

(65) Prior Publication Data

US 2009/0316546 A1    Dec. 24, 2009

(51) Int. Cl.
*G11B 27/36* (2006.01)
*G06F 12/00* (2006.01)
*G06F 13/00* (2006.01)
*G06F 13/28* (2006.01)

(52) U.S. Cl. .......................................... 360/31; 711/114
(58) Field of Classification Search ........................ None
See application file for complete search history.

(56) References Cited

U.S. PATENT DOCUMENTS

2007/0192538 A1* 8/2007 Dawkins ...................... 711/114
2007/0233449 A1* 10/2007 Peterson et al. ................ 703/20

* cited by examiner

*Primary Examiner* — Regina N Holder
(74) *Attorney, Agent, or Firm* — Suiter Swantz pc llo

(57) ABSTRACT

A storage system is configured to determine a redundancy group configuration for a plurality of storage drives by grouping storage drives with a similar performance group designation together. When a storage drive is inserted, the storage system tests the performance of the storage drive. The storage drive may comprise a serial ATA (advanced technology attachment) (SATA) hard drive and/or a solid state drive. The storage system stores the result in a database. The storage system assigns the storage drive a performance group designation based on the result and groups the storage drive into a redundancy group. The storage system then displays the redundancy group configuration for the plurality of storage drives so that a storage administrator may configure the redundancy groupings of the storage drives of the storage system based on the redundancy group configuration displayed.

18 Claims, 3 Drawing Sheets

STORAGE DRIVE PERFORMANCE CHARACTERIZATION

TECHNICAL FIELD

The present disclosure generally relates to the field of storage systems, and more particularly to characterization of storage drive performance for a storage system.

BACKGROUND

Storage subsystems typically group storage drives with similar performance characteristics together into redundancy groups. Hard disk drives (non-volatile storage devices which store digitally encoded data on rotating platters with magnetic surfaces) include performance characteristics that are closely tied to rotational speed. For purposes of categorizing hard disk drives by performance in storage drive arrays, rotational speed may be utilized. Unlike hard disk drives, solid state drives (data storage devices that utilize solid-state memory to store persistent data) have no rotational speed and there is no standard mechanism to query a solid state drive to determine its performance characteristics. The variance in the performance characteristics of solid state drives is much larger than the variation among the performance characteristics of hard disk drives. For example, the write performance at a 4 kilobyte block size may vary from 15 IOs (input/output operations) per second to 18,000 IOs per second. Additionally, serial ATA (advanced technology attachment) (SATA) hard drives have no means of reporting rotational speed via the SATA interface.

SUMMARY

A storage system may include a storage subsystem including a plurality of storage drives. The storage subsystem may be configured to determine a redundancy group configuration for the plurality of storage drives by grouping storage drives with a similar performance group designation together. When a storage drive is inserted into the storage subsystem such that the storage subsystem is able to utilize the storage drive to store data, the storage subsystem may be configured to test the performance of the storage drive. The storage drive may comprise a serial ATA (advanced technology attachment) (SATA) hard drive and testing the performance may comprise determining a rotational speed of the SATA hard drive. The storage drive may comprise a solid state drive. Testing the performance of the storage drive may comprise testing read and/or write performance of the storage drive by issuing a read and/or write command to the storage drive and evaluating a response of the storage drive to the read and/or write command. Testing the performance of the storage drive may comprise issuing a sequential command sequence and/or a random command sequence to the storage drive a random command sequence to the storage drive and evaluating a response of the storage drive to the sequential command sequence and/or the random command sequence. Testing the performance of the storage drive may comprise issuing a plurality of commands with different data transfer lengths to the storage drive and evaluating a response of the storage drive to the plurality of commands with different data transfer lengths.

The storage subsystem may be configured to store the result of the testing of the performance of the storage drive in a storage media of the storage subsystem in a database. The storage subsystem may be configured to assign the storage drive a performance group designation based on the result of the testing. After the performance characteristics of the storage drive have been determined, the storage system may be configured to group the storage drive into a redundancy group with one or more of the plurality of storage drives of the storage subsystem. The storage system may be configured to display the redundancy group configuration for the plurality of storage drives on a display so that a storage administrator may configure the redundancy groupings of the storage drives of the storage subsystem based on the redundancy group configuration displayed.

Thus, the storage system may be able to determine the performance characteristics of the storage drives and group the storage drives into redundancy groups without prior knowledge of the performance characteristics of the models of the storage drives and without being able to determine the performance characteristics of the storage drives by querying the storage drives for rotational speed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

A storage system may group storage drives with similar performance characteristics together into redundancy groups. In order to group storage drives with similar performance characteristics into redundancy groups, the performance characteristics of the storage drives must be determined. The performance characteristics of some hard disk drives may be determined based on rotational speed (which may be obtained by querying the hard disk drives). However, the storage system may not be able to determine the performance characteristics of storage drives such as SATA serial ATA (advanced technology attachment) (SATA) hard drives and/or solid state drives in this fashion, as SATA hard drives have no means of reporting rotational speed via the SATA interface and solid state drives have no rotational speed or standard mechanism for querying for performance characteristics.

A table of performance characteristics may be maintained for various models of storage drives such as SATA hard drives and/or solid state drives. The storage system may then determine the performance characteristics of one or more SATA hard drives and/or solid state drives by looking up the model of the one or more SATA hard drives and/or solid state drives in the table. However, this table based approach is limited to models of SATA hard drives and/or solid state drives that have entries in the table. A storage system utilizing this table would still be unable to ascertain the performance characteristics of models of one or more SATA hard drives and/or solid state drives not entered in the table. The table would have to be updated with the performance characteristics of the one or more SATA hard drives and/or solid state drives before the one or more SATA hard drives and/or solid state drives could be grouped into redundancy groups based on performance characteristics.

Alternatively, the storage system may not group SATA hard drives and/or solid state drives into redundancy groups based on performance characteristics. However, in this case a storage drive with poorer performance would prevent the storage system from exploiting the superior performance of other storage drives in the redundancy group.

Figure 1:
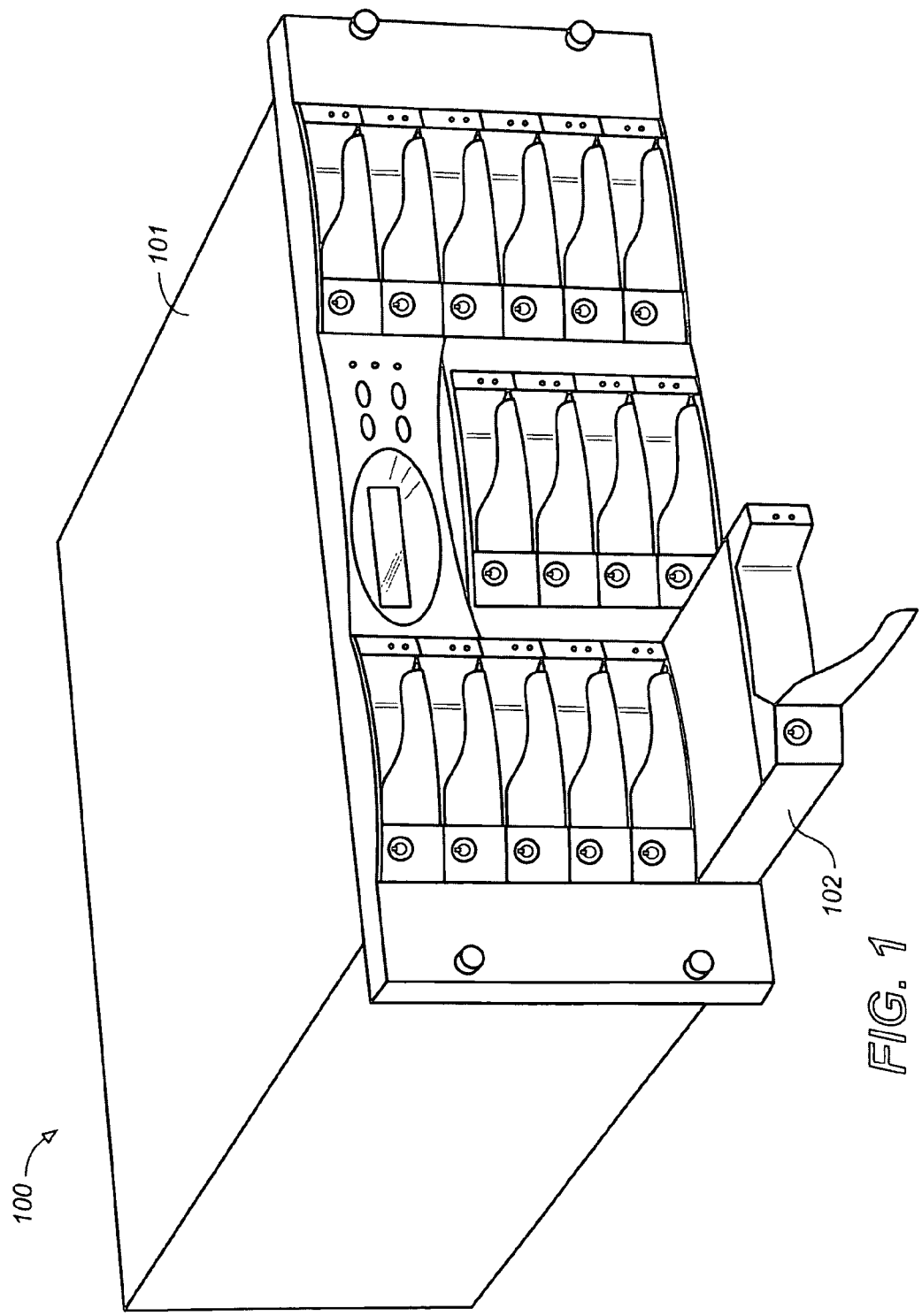
FIG. 1 is a diagram illustrating a storage system, in accordance with an embodiment of the present disclosure.

FIG. 1 illustrates a storage system 100, in accordance with an embodiment of the present invention. The storage system 100 may include a storage subsystem 101 including a plurality of storage drives 102. The storage subsystem 101 may be configured to determine a redundancy group configuration for the plurality of storage drives 102 by grouping storage drives 102 with a similar performance group designation together. For example, the storage subsystem 101 may be configured to determine a redundancy group configuration for the plurality of storage drives 102 by grouping storage drives 102 with low performance group designations (which may comprise storage drives with a write performance at a 4 kilobyte block size of less than approximately 1000 IOs per second) together, grouping storage drives 102 with medium performance group designations (which may comprise storage drives with a write performance at a 4 kilobyte block size between approximately 1000 and 10,000 IOs per second) together, and or grouping storage drives 102 with high performance group designations (which may comprise storage drives with a write performance at a 4 kilobyte block size of more than approximately 10,000 IOs per second) together. The storage subsystem 101 is illustrated with an available slot for a storage drive 102 (depicted as separate from the storage subsystem 101) to be inserted into such that the storage subsystem 101 is able to utilize the storage drive 102 to store data.

Figure 2:
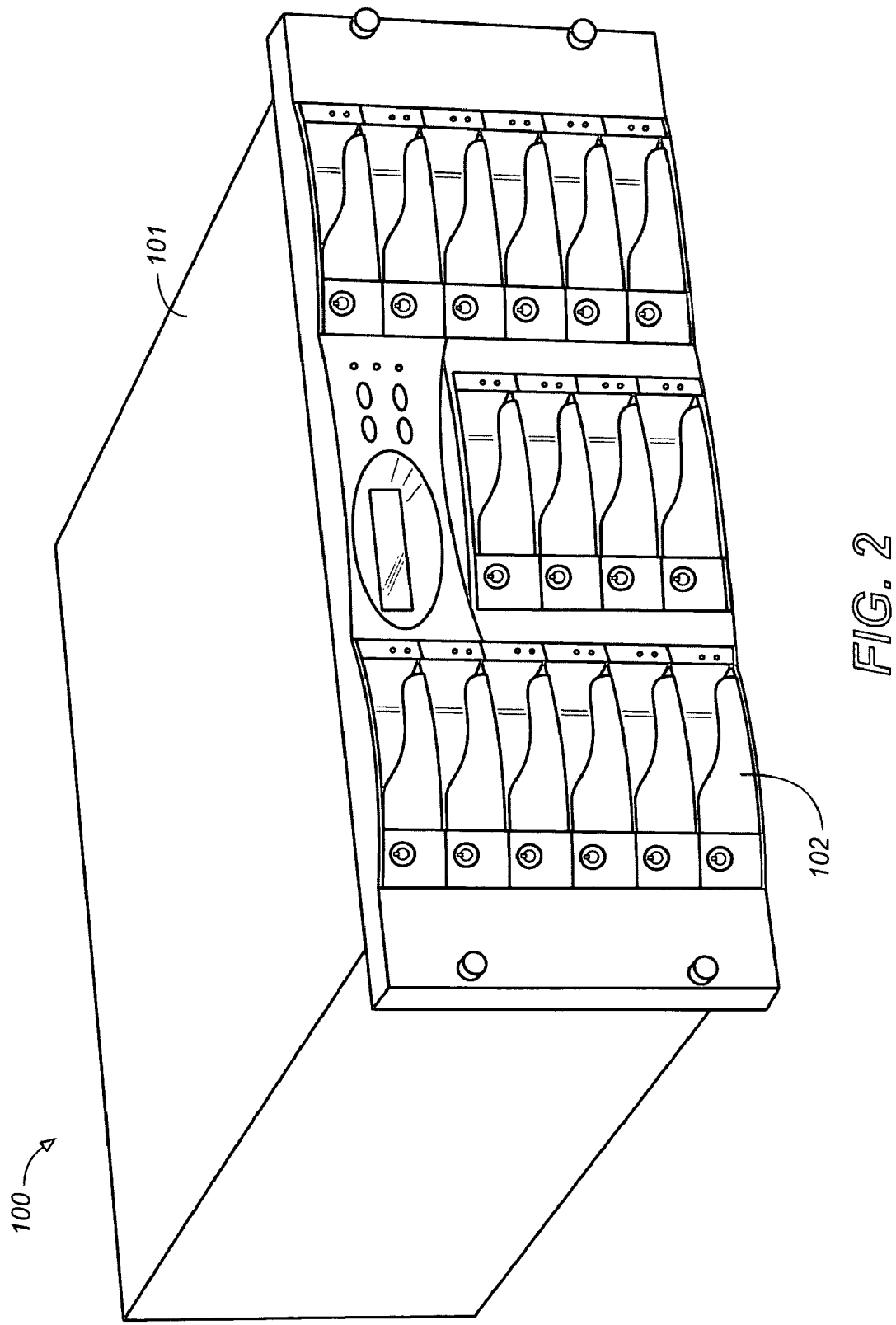
FIG. 2 is a is a diagram illustrating the storage system illustrated in FIG. 1, in accordance with an embodiment of the present disclosure.

When the storage drive 102 is inserted into the storage subsystem 101 such that the storage subsystem 101 is able to utilize the storage drive 102 to store data (depicted in FIG. 2), the storage subsystem 101 may be configured to test the performance of the storage drive 102. The storage drive 102 may comprise a SATA hard drive. If the storage drive 102 comprises a SATA hard drive, testing the performance of the storage drive may comprise determining a rotational speed of the SATA hard drive. The storage drive 102 may comprise a solid state drive. Testing the performance of the storage drive 102 may comprise testing read performance of the storage drive 102. Testing read performance of the storage drive 102 may comprise issuing a read command to the storage drive 102 and evaluating a response of the storage drive 102 to the read command. Testing the performance of the storage drive 102 may comprise testing write performance of the storage drive 102. Testing write performance of the storage drive 102 may comprise issuing a write command to the storage drive 102 and evaluating a response of the storage drive 102 to the write command. Testing the performance of the storage drive 102 may comprise issuing at least one read command and at least one write command to the storage drive 102 and evaluating a response of the storage drive 102 to the at least one read command and at least one write command. The at least one read command and at least one write command may comprise a mix of read and write commands (such as 70% read commands and 30% write commands). Testing the performance of the storage drive 102 may comprise issuing a sequential command sequence to the storage drive 102 and evaluating a response of the storage drive 102 to the sequential command sequence. Testing the performance of the storage drive 102 may comprise issuing a random command sequence to the storage drive 102 and evaluating a response of the storage drive 102 to the random command sequence. Testing the performance of the storage drive 102 may comprise issuing at least one random command sequence and at least one random command sequence to the storage drive 102 and evaluating a response of the storage drive 102 to the at least one random command sequence and at least one random command sequence. The at least one random command sequence and at least one random command sequence may comprise a mix of sequential command sequences and random command sequences. Testing the performance of the storage drive 102 may comprise issuing at least one command with a first data transfer length and at least one additional command with a second data transfer length to the storage drive 102 and evaluating a response of the storage drive 102 to the at least one command with the first data transfer length and at least one additional command with the second data transfer length. Testing the performance of the storage drive 102 may comprise issuing a plurality of commands with different data transfer lengths to the storage drive 102 and evaluating a response of the storage drive 102 to the plurality of commands with different data transfer lengths.

The storage subsystem 101 may be configured to store the result of the testing of the performance of the storage drive 102 in a storage media of the storage subsystem 101 (including, but not limited to, a storage drive, a main memory, a cache memory, and/or any other tangible medium). The result may be stored in a data structure including, but not limited to, a database and/or a table.

The storage subsystem 101 may be configured to assign the storage drive 102 a performance group designation based on the result of the testing. For example, if the result of the test shows that the storage drive 102 has a write performance at a 4 kilobyte block size of 15 IOs (input/output operations) per second, the storage drive 102 may be assigned a low performance designation. By way of another example, if the result of the test shows that the storage drive 102 has a write performance at a 4 kilobyte block size of 18,000 IOs per second, the storage drive 102 may be assigned a high performance designation.

After the performance characteristics of the storage drive 102 have been determined, the storage system 101 may be configured to group the storage drive 102 into a redundancy group with one or more of the plurality of storage drives 102 of the storage subsystem 101. For example, the storage subsystem 101 may be configured to group the storage drive 102 into a redundancy group with one or more of the plurality of storage drives 102 of the storage subsystem 101 which each have a low performance group designation if the storage drive has been assigned a low performance group designation. By way of another example, the storage subsystem 101 may be configured to group the storage drive 102 into a redundancy group with one or more of the plurality of storage drives 102 of the storage subsystem 101 which each have a medium performance group designation if the storage drive has been assigned a medium performance group designation. By way of still another example, the storage subsystem 101 may be configured to group the storage drive 102 into a redundancy group with one or more of the plurality of storage drives 102 of the storage subsystem 101 which each have a high performance group designation if the storage drive has been assigned a high performance group designation. The storage subsystem 101 may be configured to display the redundancy group configuration for the plurality of storage drives 102 on a display including, but not limited to, a cathode-ray tube display, a liquid crystal display, and/or a light-emitting diode display. The storage subsystem 101 may be configured to display the redundancy group configuration for the plurality of storage drives 102 so that a storage administrator may configure the redundancy groupings of the storage drives 102 of the storage subsystem 101 based on the redundancy group configuration displayed. Thus, the storage system 101 may be able to determine the performance characteristics of the storage drives 102 and group the storage drives 102 into redundancy groups without prior knowledge of the performance characteristics of the models of the storage drives 102 and without being able to determine the performance characteristics of the storage drives 102 by querying the storage drives for rotational speed.

The present disclosure is described below with reference to flowchart illustrations of methods. It will be understood that each block of the flowchart illustrations and/or combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart. These computer program instructions may also be stored in a computer-readable tangible medium (thus comprising a computer program product) that can direct a computer or other programmable data processing apparatus to function in a particular manner, such that the instructions stored in the computer-readable tangible medium produce an article of manufacture including instruction means which implement the function/act specified in the flowchart.

Figure 3:
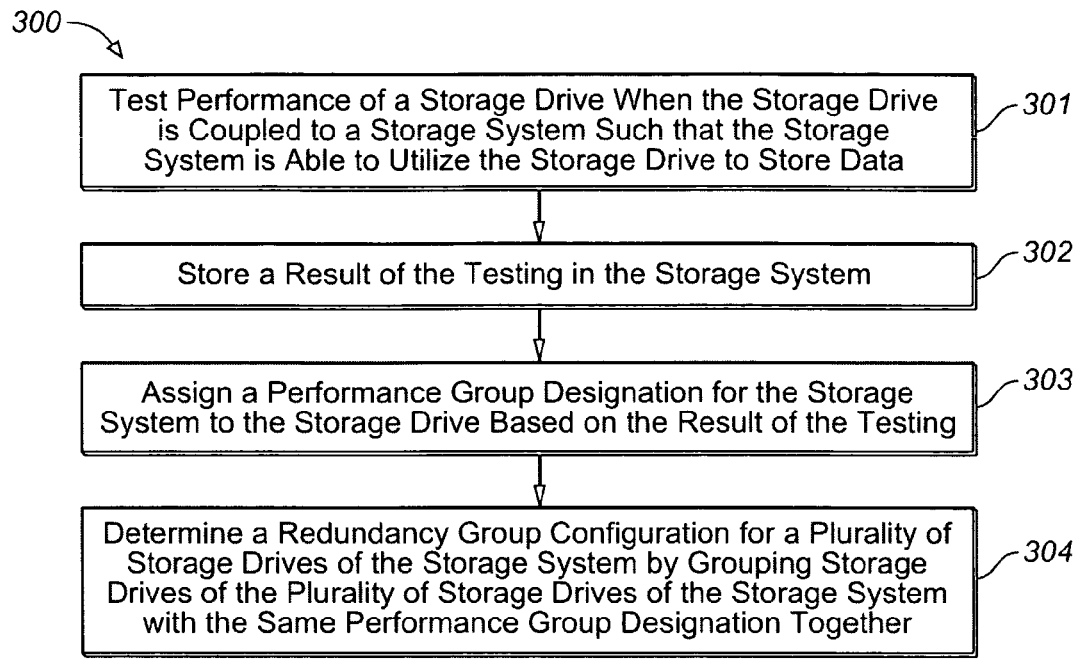
FIG. 3 is a flow diagram illustrating a method for grouping storage drives of a storage system into redundancy groups, in accordance with an embodiment of the present disclosure.

FIG. 3 illustrates a method of grouping storage drives of a storage system into redundancy groups, in accordance with an embodiment of the present disclosure. In step 301, test performance of a storage drive when the storage drive is coupled to a storage system such that the storage system is able to utilize the storage drive to store data. The storage drive may comprise a SATA hard drive. Testing performance of a SATA hard drive may comprise determining a rotational speed of the SATA hard drive. The storage drive may comprise a solid state drive. Testing performance of a storage drive may comprise testing read performance of the storage drive by issuing a read command to the storage drive and evaluating a response of the storage drive to the read command. Testing performance of a storage drive may comprise testing write performance of the storage drive by issuing a write command to the storage drive and evaluating a response of the storage drive to the write command. Testing the performance of the storage drive may comprise issuing at least one read command and at least one write command to the storage drive and evaluating a response of the storage drive to the at least one read command and at least one write command. The at least one read command and at least one write command may comprise a mix of read and write commands (such as 70% read commands and 30% write commands). Testing the performance of the storage drive may comprise issuing a sequential command sequence to the storage drive and evaluating a response of the storage drive to the sequential command sequence. Testing the performance of the storage drive may comprise issuing a random command sequence to the storage drive and evaluating a response of the storage drive to the random command sequence. Testing the performance of the storage drive may comprise issuing at least one random command sequence and at least one random command sequence to the storage drive and evaluating a response of the storage drive to the at least one random command sequence and at least one random command sequence. The at least one random command sequence and at least one random command sequence may comprise a mix of sequential command sequences and random command sequences. Testing the performance of the storage drive may comprise issuing at least one command with a first data transfer length and at least one additional command with a second data transfer length to the storage drive and evaluating a response of the storage drive to the at least one command with the first data transfer length and at least one additional command with the second data transfer length. Testing the performance of the storage drive may comprise issuing a plurality of commands with different data transfer lengths to the storage drive and evaluating a response of the storage drive to the plurality of commands with different data transfer lengths. In step 302, store a result of the testing in the storage system. In step 303, assign a performance group designation for the storage system to the storage drive based on the result of the testing. In step 304, determine a redundancy group configuration for a plurality of storage drives of the storage system by grouping storage drives of the plurality of storage drives of the storage system with the same performance group designation together.

Figure 4:
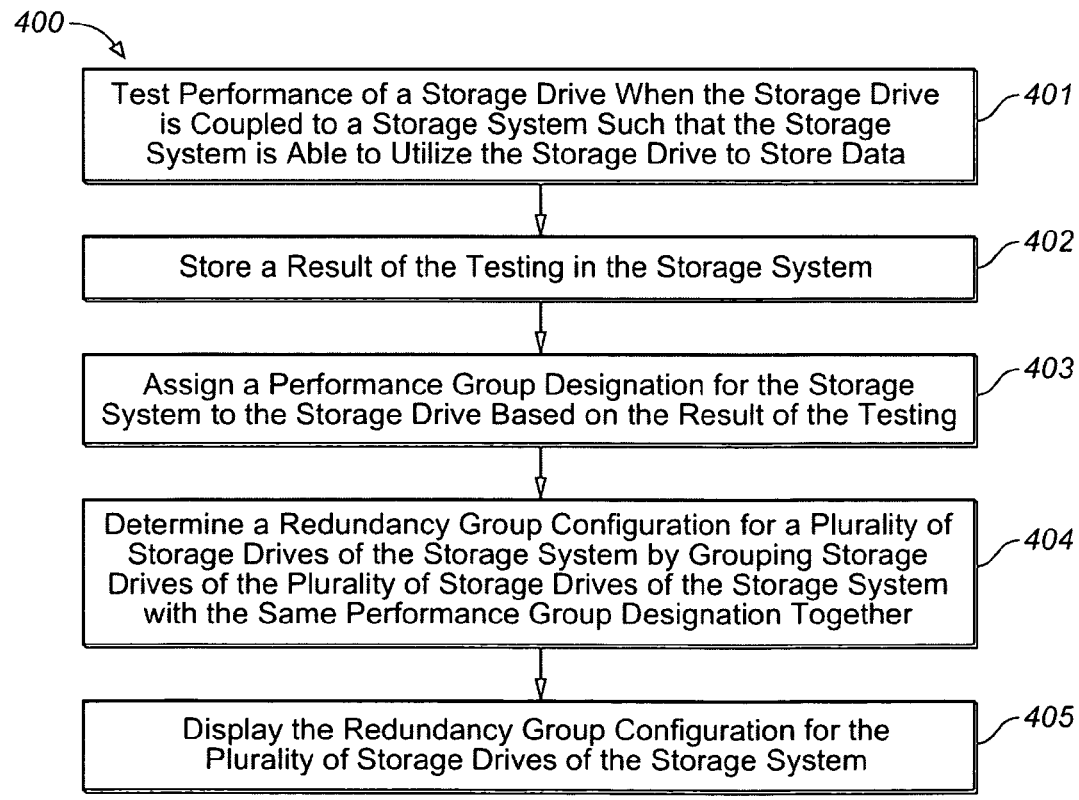
FIG. 4 is a flow diagram illustrating a method for grouping storage drives of a storage system into redundancy groups, in accordance with an alternative embodiment of the present disclosure.

FIG. 4 illustrates a method of grouping storage drives of a storage system into redundancy groups, in accordance with an embodiment of the present disclosure. In step 401, test performance of a storage drive when the storage drive is coupled to a storage system such that the storage system is able to utilize the storage drive to store data. The storage drive may comprise a SATA hard drive. Testing performance of a SATA hard drive may comprise determining a rotational speed of the SATA hard drive. The storage drive may comprise a solid state drive. Testing performance of a storage drive may comprise testing read performance of the storage drive by issuing a read command to the storage drive and evaluating a response of the storage drive to the read command. Testing performance of a storage drive may comprise testing write performance of the storage drive by issuing a write command to the storage drive and evaluating a response of the storage drive to the write command. Testing the performance of the storage drive may comprise issuing at least one read command and at least one write command to the storage drive and evaluating a response of the storage drive to the at least one read command and at least one write command. The at least one read command and at least one write command may comprise a mix of read and write commands (such as 70% read commands and 30% write commands). Testing the performance of the storage drive may comprise issuing a sequential command sequence to the storage drive and evaluating a response of the storage drive to the sequential command sequence. Testing the performance of the storage drive may comprise issuing a random command sequence to the storage drive and evaluating a response of the storage drive to the random command sequence. Testing the performance of the storage drive may comprise issuing at least one random command sequence and at least one random command sequence to the storage drive and evaluating a response of the storage drive to the at least one random command sequence and at least one random command sequence. The at least one random command sequence and at least one random command sequence may comprise a mix of sequential command sequences and random command sequences. Testing the performance of the storage drive may comprise issuing at least one command with a first data transfer length and at least one additional command with a second data transfer length to the storage drive and evaluating a response of the storage drive to the at least one command with the first data transfer length and at least one additional command with the second data transfer length. Testing the performance of the storage drive may comprise issuing a plurality of commands with different data transfer lengths to the storage drive and evaluating a response of the storage drive to the plurality of commands with different data transfer lengths. In step 402, store a result of the testing in the storage system. In step 403, assign a performance group designation for the storage system to the storage drive based on the result of the testing. In step 404, determine a redundancy group configuration for a plurality of storage drives of the storage system by grouping storage drives of the plurality of storage drives of the storage system with the same performance group designation together. In step 405, display the redundancy group configuration for the plurality of storage drives of the storage system.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
    testing performance of a storage drive when the storage drive is coupled to a storage system such that the storage system is able to utilize the storage drive to store data, wherein testing performance of the storage drive further comprises:
        testing read performance of the storage drive by issuing at least one read command to the storage drive and evaluating a response of the storage drive to the at least one read command; and
        testing write performance of the storage drive by issuing a first random command sequence with a first random data transfer length and a second random command sequence with a second random data transfer length to the storage drive and evaluating a response of the storage drive to the first random command sequence with the first random data transfer length and the second random command sequence with the second random data transfer length;
    storing a result of the testing in the storage system;
    assigning the storage drive a particular predetermined performance group designation of a plurality of predetermined performance group designations for the storage system based on the result of the testing, wherein the plurality of predetermined performance group designations includes at least a predetermined low performance group designation, a predetermined medium performance group designation, and a predetermined high performance group designation;
    determining a redundancy group configuration for a plurality of storage drives of the storage system by grouping storage drives of the plurality of storage drives of the storage system with the same particular predetermined performance group designation together;
    displaying the redundancy group configuration on a display; and
    receiving user input configuring the storage drives into groups based at least in part on the displayed redundancy group configuration.

2. The method of claim 1, wherein said testing performance of a storage drive comprises:
    testing performance of a serial ATA (advanced technology attachment) (SATA) hard drive.

3. The method of claim 2, wherein said testing performance of a SATA hard drive comprises:
    determining a rotational speed.

4. The method of claim 1, wherein said testing performance of a storage drive comprises:
    testing performance of a solid state drive.

5. The method of claim 1, wherein said testing performance of a storage drive comprises:
    testing read performance of the storage drive by:
        issuing a write command to the storage drive and evaluating a response of the storage drive to the write command; and
        issuing at least one read command and at least one write command to the storage drive and evaluating a response of the storage drive to the at least one read command and the at least one write command.

6. The method of claim 1, wherein said testing performance of a storage drive comprises:
    testing write performance of the storage drive by:
        issuing a sequential command sequence to the storage drive and evaluating a response of the storage drive to the sequential command sequence; and
        issuing at least one sequential command sequence and at least one random command sequence to the storage drive and evaluating a response of the storage drive to the at least one sequential command sequence and the at least one random command sequence.

7. A system, comprising:
    a storage system including a storage media; and
    a storage drive,
    wherein the storage system is configured to test performance of the storage drive when the storage drive is coupled to the storage system such that the storage system is able to utilize the storage drive to store data, wherein the storage system being configured to test performance of the storage drive further comprises being configured to:
        test read performance of the storage drive by issuing at least one read command to the storage drive and evaluating a response of the storage drive to the at least one read command; and
        test write performance of the storage drive by issuing a first random command sequence with a first random data transfer length and a second random command sequence with a second random data transfer length to the storage drive and evaluating a response of the storage drive to the first random command sequence with the first random data transfer length and the second random command sequence with the second random data transfer length, and wherein the storage system is configured to store a result of the testing in the storage media, wherein the storage system is configured to assign the storage drive a particular predetermined performance group designation of a plurality of predetermined performance group designations for the storage system based on the result of the testing, wherein the plurality of predetermined performance group designations includes at least a predetermined low performance group designation, a predetermined medium performance group designation, and a predetermined high performance group designation, wherein the storage system is configured to determine a redundancy group configuration for a plurality of storage drives of the storage system by grouping storage drives of the plurality of storage drives of the storage system with the same particular predetermined performance group designation together, and wherein the storage system is further configured to display the redundancy group configuration on a display and receive user input configuring the storage drives into groups based at least in part on the displayed redundancy group configuration.

8. The system of claim 7, wherein the storage drive comprises a serial ATA (advanced technology attachment) (SATA) hard drive.

9. The system of claim 8, wherein the storage system is configured to determine a rotational speed of the SATA hard drive.

10. The system of claim 7, wherein the storage drive comprises a solid state drive.

11. The system of claim 7, wherein the storage system is configured to test read performance of the storage drive by issuing a write command to the storage drive and evaluating a response of the storage drive to the write command, and issuing at least one read command and at least one write command to the storage drive and evaluating a response of the storage drive to the at least one read command and the at least one write command.

12. The system of claim 7, wherein the storage system is configured to test write performance of the storage drive by issuing a sequential command sequence to the storage drive and evaluating a response of the storage drive to the sequential command sequence, and issuing at least one sequential command sequence and at least one random command sequence to the storage drive and evaluating a response of the storage drive to the at least one sequential command sequence and the at least one random command sequence.

13. A computer program product for characterizing storage drive performance, the computer program product comprising:

a non-transitory computer usable medium having computer usable code tangibly embodied therewith, the computer usable program code comprising:

computer usable program code configured to test performance of a storage drive when the storage drive is coupled to a storage system such that the storage system is able to utilize the storage drive to store data, wherein the computer usable program code being configured to test performance of the storage drive further comprises being configured to:

test read performance of the storage drive by issuing at least one read command to the storage drive and evaluating a response of the storage drive to the at least one read command; and test write performance of the storage drive by issuing a first random command sequence with a first random data transfer length and a second random command sequence with a second random data transfer length to the storage drive and evaluating a response of the storage drive to the first random command sequence with the first random data transfer length and the second random command sequence with the second random data transfer length;

computer usable program code configured to store a result of the testing in the storage system;

computer usable program code configured to assign the storage drive a particular predetermined performance group designation of a plurality of predetermined performance group designations based on the result of the testing, wherein the plurality of predetermined performance group designations includes at least a predetermined low performance group designation, a predetermined medium performance group designation, and a predetermined high performance group designation;

computer usable program code configured to determine a redundancy group configuration for a plurality of storage drives of the storage system by grouping storage drives of the plurality of storage drives of the storage system with the same particular predetermined performance group designation together; and computer usable program code configured to display the redundancy group configuration on a display and receive user input configuring the storage drives into groups based at least in part on the displayed redundancy group configuration.

14. The computer program product of claim 13, wherein said computer usable program code configured to test performance of a storage drive comprises:

computer usable program code configured to test performance of a serial ATA (advanced technology attachment) (SATA) hard drive.

15. The computer program product of claim 14, wherein said computer usable program code configured to test performance of a SATA hard drive comprises:

computer usable program code configured to determine a rotational speed.

16. The computer program product of claim 13, wherein said computer usable program code configured to test performance of a storage drive comprises:

computer usable program code configured to test performance of a solid state drive.

17. The computer program product of claim 13, wherein said computer usable program code configured to test performance of a storage drive comprises:

computer usable program code configured to test read performance of the storage drive by issuing a write command to the storage drive and evaluating a response of the storage drive to the write command, and issuing at least one read command and at least one write command to the storage drive and evaluating a response of the storage drive to the at least one read command and the at least one write command.

18. The computer program product of claim 13, wherein said computer usable program code configured to test performance of a storage drive comprises:

computer usable program code configured to test write performance of the storage drive by of issuing a sequential command sequence to the storage drive and evaluating a response of the storage drive to the sequential command sequence, and issuing at least one sequential command sequence and at least one random command sequence to the storage drive and evaluating a response of the storage drive to the at least one sequential command sequence and the at least one random command sequence.

* * * * *